United States Patent
Cooper

(10) Patent No.: US 10,520,071 B2
(45) Date of Patent: *Dec. 31, 2019

(54) DRIVE UNIT FOR SHIFTING A TORQUE BALANCE

(71) Applicant: Dana Automotive Systems Group, LLC, Maumee, OH (US)

(72) Inventor: Kenneth E. Cooper, Las Vegas, NV (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/137,829

(22) Filed: Sep. 21, 2018

(65) Prior Publication Data

US 2019/0120358 A1   Apr. 25, 2019

Related U.S. Application Data

(62) Division of application No. 14/991,201, filed on Jan. 8, 2016, now Pat. No. 10,113,630.

(51) Int. Cl.
*B60K 1/00* (2006.01)
*F16H 48/10* (2012.01)
(Continued)

(52) U.S. Cl.
CPC ......... *F16H 37/0813* (2013.01); *F16H 48/10* (2013.01); *F16H 48/36* (2013.01);
(Continued)

(58) Field of Classification Search
CPC .................... B60K 2001/001; F16H 2048/108
See application file for complete search history.

(56) References Cited

U.S. PATENT DOCUMENTS 2,147,145 A   2/1939   Carlson
2,618,359 A   11/1952  Alden
(Continued)

FOREIGN PATENT DOCUMENTS

JP   H0979347    3/1997
JP   H11105573   4/1999
(Continued)

OTHER PUBLICATIONS

Machine-generated English Translation of JPH11105573, obtained via J-PlatPat. 4 pages.
(Continued)

*Primary Examiner* — Tisha D Lewis
(74) *Attorney, Agent, or Firm* — Marshall & Melhorn, LLC

(57) ABSTRACT

A drive unit utilizing a double planetary differential and an overdriven gear to shift torque between output shafts. The drive unit includes a motor, a differential caging housing a planetary differential and in driving engagement with two output shafts, a planetary carrier, a first gear, a second gear, and two variably engageable clutches. The planetary carrier supports the planetary differential and is drivingly engaged with a first output shaft. The first gear is capable of being overdriven and is in driving engagement with the motor and the variably engaged clutches. The second gear is in driving engagement with the motor and the differential caging. The first clutch is disposed between the first gear and the second output shaft and the second clutch is disposed between the first gear and the planetary carrier. When the clutches are actuated, torque is shifted between the output shafts via the first gear.

20 Claims, 2 Drawing Sheets

(51) Int. Cl.
*F16H 37/08* (2006.01)
*F16H 48/36* (2012.01)

(52) U.S. Cl.
CPC .. *B60K 2001/001* (2013.01); *F16H 2048/108* (2013.01); *Y02T 10/7258* (2013.01)

(56) References Cited

U.S. PATENT DOCUMENTS

| | | | |
|---|---|---|---|
| 3,413,873 | A | 12/1968 | Bixby |
| 4,095,675 | A | 6/1978 | Bell |
| 4,227,427 | A | 10/1980 | Dick |
| 4,611,504 | A | 9/1986 | Rundle |
| 5,533,943 | A | 7/1996 | Ichioka |
| 5,620,387 | A | 4/1997 | Janiszewski |
| 5,735,767 | A * | 4/1998 | Forsyth ............ F16D 23/06 475/205 |
| 6,098,737 | A | 8/2000 | Aoki |
| 6,117,038 | A | 9/2000 | Nishiji |
| 6,125,953 | A | 10/2000 | Arai |
| 6,540,636 | B2 | 4/2003 | Amanuma |
| 6,827,663 | B2 | 12/2004 | Tucker-Peake |
| 7,296,644 | B2 | 11/2007 | Teraoka |
| 7,316,627 | B2 | 1/2008 | Bennett |
| 7,497,286 | B2 | 3/2009 | Keller |
| 8,012,057 | B2 | 9/2011 | Meixner |
| 8,454,473 | B2 | 6/2013 | Reitz |
| 8,556,760 | B2 | 10/2013 | Mack |
| 8,585,520 | B2 | 11/2013 | Turnbull |
| 8,622,865 | B2 | 1/2014 | Su |
| 8,678,968 | B2 | 3/2014 | Troennberg |
| 8,827,859 | B2 | 9/2014 | Fox |
| 8,876,643 | B2 | 11/2014 | Fickel |
| 8,992,366 | B2 | 3/2015 | Gassmann |
| 9,039,559 | B2 | 5/2015 | Gassmann |
| 9,073,538 | B2 | 7/2015 | Mack |
| 9,671,016 | B2 | 6/2017 | Nakayama |
| 2010/0267508 | A1 | 10/2010 | Hvolka |
| 2011/0011655 | A1* | 1/2011 | Venturi .............. B60K 6/36 180/65.22 |
| 2011/0160015 | A1* | 6/2011 | Ren .................. B60K 6/442 475/5 |
| 2014/0371020 | A1 | 12/2014 | Cooper |
| 2015/0226296 | A1 | 8/2015 | Gassmann |
| 2015/0226297 | A1 | 8/2015 | Knoblauch |

FOREIGN PATENT DOCUMENTS

| | | |
|---|---|---|
| JP | 2001287550 | 10/2001 |
| JP | 2010247690 | 11/2010 |

OTHER PUBLICATIONS

Machine-generated English Translation of JPH09079347, obtained via J-PlatPat. 5 pages.
Machine-generated English Translation of JP2001-287550, obtained via J-PlatPat. 25 pages.
Machine-generated English Translation of JP2010-247690, obtained via J-PlatPat. 11 pages.
English Translation of the Japanese Office Action for Patent Application No. 2016-255390, dated Feb. 6, 2018. 5 pages.

* cited by examiner

DRIVE UNIT FOR SHIFTING A TORQUE BALANCE

RELATED APPLICATIONS

This application is a divisional of U.S. patent application Ser. No. 14/991,201 filed on Jan. 8, 2016, which is fully incorporated by reference herein.

FIELD OF THE INVENTION

The present invention relates to a drive unit utilizing a double planetary differential arrangement and an overdriven gear which may be variably engaged with two output shafts of the double planetary differential arrangement to shift torque between the two output shafts.

BACKGROUND OF THE INVENTION

Drive units typically comprise a motor and a reduction drive arranged to reduce the rotational movement produced by the motor. Torque is transmitted from the reduction drive to a differential assembly which splits the torque onto two output shafts for driving wheels.

Electric or hybrid vehicles using a drive unit have long been known. Hybrid electric vehicles typically have a structure which combines two power sources, an electric motor and an internal combustion engine, to produce lower emissions. Hybrid electric drive units are being developed for use in all-wheel drive vehicles such that the electric motor and an engine can transmit power to both a front set of driven wheels and rear set of driven wheels.

In all-wheel drive hybrid electric vehicles, typically a reducing gear set reduces an output speed from an electric motor and transmits the reduced output speed to a differential gear assembly. The differential gear assembly distributes the introduced torque to two output shafts so that of one of the two output shafts can rotate at a different rate with respect to one another.

It would be advantageous to develop a drive unit capable of precise torque distribution between two output shafts and respective wheels to provide improved stability and agility to a motor vehicle.

SUMMARY OF INVENTION

The present invention relates to a drive unit utilizing a double planetary differential gear arrangement and an overdriven gear to shift torque between two output shafts. The drive unit includes a motor, a differential caging which houses a double planetary gear arrangement in driving engagement with two output shafts, a planetary carrier, a first gear, a second gear and a pair of variable engaged clutches. The planetary carrier supports the double planetary differential gear arrangement and is driving engagement with a first output shaft. The first gear is in drivingly engaged with the motor and the variably engaged clutches. The second gear is in driving engagement with the motor and the planetary gears of the differential gear arrangement. The first gear is capable of being over driven by the motor with respect to the second gear. The first variably engageable clutch is disposed between the first gear and the second output shaft and the second variably engageable clutch is disposed between the first gear and the planetary carrier. When the first variable engageable clutch is actuated, an increased torque is applied to the first output shaft and when the second variably engageable clutch is actuated, an increased torque is applied to the second output shaft.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
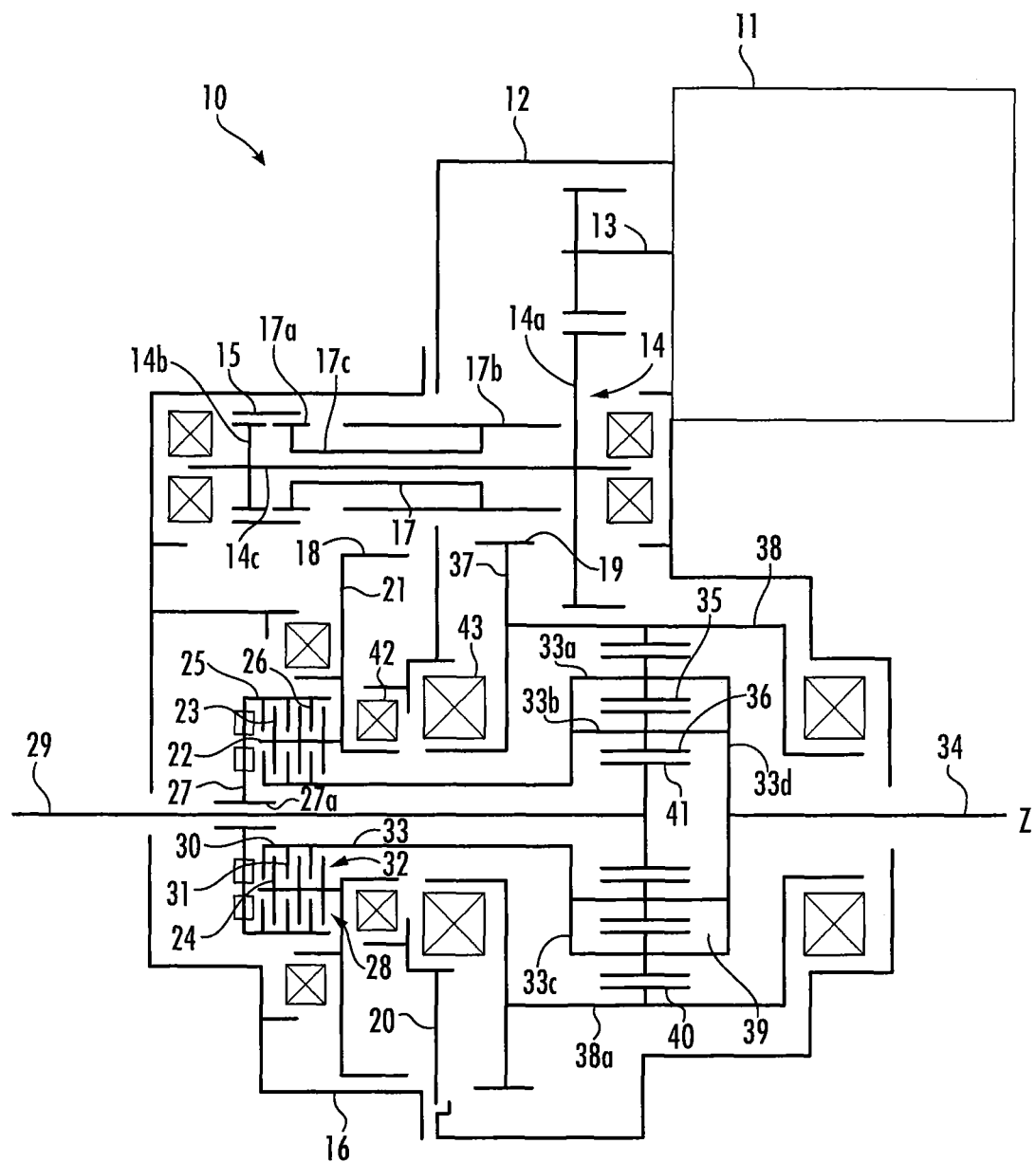
FIG. 1 is a schematic view of the drive unit assembly in accordance with a preferred embodiment of the invention.

Referring now to FIG. 1 of the drawings, one preferred embodiment of the electric drive unit assembly 10 is provided.

As shown in FIG. 1, a motor 11 is connected to a first housing member 12 and an output shaft 13. The motor 11 can be any type of motor including an electric or hydraulic motor. The first housing member 12 extends axially from the motor 11 and is radially outward compared to output shaft 13. Output shaft 13 extends axially from the motor and is radially inward from the first housing member 12.

Output shaft 13 is drivingly engaged to a reducing gear set 14. The reducing gear set 14 comprises a first reducing gear 14a and a second reducing gear 14b. The first reducing gear 14a is positioned radially inward from output shaft 13. The first reducing gear 14a is drivingly engaged with output shaft 13.

The second reducing gear 14b is connected to the first reducing gear 14a by a shaft 14c which extends axially from the first reducing gear 14a. A driving gear of the second reducing gear 14b is capable of being engaged with a first clutching device 15.

The first clutching device 15 is positioned radially outward from the second reducing gear 14b and is supported by a second housing member 16. The first clutching device 15 can be actuated by any means, particularly, electro-mechanical, hydraulic or electro-magnetic means. As shown in FIG. 1 the first clutching device is a dog clutch, but can be any type of clutching device.

The first clutching device 15 is capable of selectively coupling the second reducing gear 14b and a pinion gear 17. Pinion gear 17 has two pinions 17a, 17b connected by an axially extending shaft 17c. The pinion gear 17 is rotatable around the shaft 14c of the reducing gear set. Pinions 17a, 17b have teeth formed thereon. Pinion 17a is capable of engaging the first clutching device 15. Pinion 17b is drivingly engaged with a set of ring gears 18, 19. Pinion 17b and ring gears 18, 19 have a common center distance.

The ring gears 18, 19 are positioned radially inward from pinion gear 17. The ring gears 18, 19 have teeth disposed thereon. The first ring gear 18 has fewer gear teeth than the second ring gear 19 allowing the first ring gear 18 to be driven faster that the second ring gear. Therefore, the first ring gear 18 is overdriven with respect to the second ring gear 19.

In one preferred embodiment, the pinion gear 17 has 17 teeth, the first ring gear 18 has 50 teeth and the second gear 19 has 51 teeth. In other embodiments, the number of teeth on each gear can be selected to give an over speed of about 2 to about 4.5 percent of the first ring gear 18 with respect to the second ring gear 19.

The first housing member 12 is disposed radially outward from ring gear 19 and the second housing member 16 is disposed radially outward from ring gear 18. A third housing member 20 is disposed between gears 18, 19. As shown in FIG. 1, a portion of the third housing member 20 is located between the first housing member 12 and the second housing member 16, fixing the axial position of the third housing member 20 without requiring additional means of retention including retention bolts. The shape of the third housing member 20, as shown in FIG. 1, prevents rotation of the housing. In other embodiments, other means can be used to prevent rotation, including dowels.

The first ring gear 18 is connected to a radial shaft 21. Radial shaft 21 extends radially inward from first ring gear 18 and has a first clutch hub 22 extending axially outward from the other end thereof. The clutch hub 22 has one set of clutch plates 23 extending radially outward thereon and a second set of clutch plates 24 extending radially inward thereon.

A second clutch hub 25, parallel to clutch hub 22 and radially outward therefrom, has a set of clutch plates 26 extending radially inward thereon. Clutch plates 23 and 26 are interleaved to form a clutch pack. The second clutch hub 25 extends axially from a radially extending output shaft 27. The output shaft 27 extends radially inward from the end of second clutch hub 25 towards a rotational axis Z. Clutch plates 23, 26, clutch hubs 22, 25 and shaft 27 form a first variably engageable clutch 28. Shaft 27 has a gear 27a formed on the radially inward end which is drivingly engaged with a first output shaft 29. Output shaft 29 is an axle half shaft of a motor vehicle. When the first variably engageable clutch 28 is engaged, torque is transferred from the motor through the first ring gear 18 and shaft 27 to output shaft 29.

A third clutch hub 30, parallel to clutch hub 22 and radially inward therefrom, has a set of clutch plates 31 extending radially outward thereon. Clutch plates 24, 31 are interleaved to form a clutch pack. Clutch plates 24, 31, clutch hubs 22, 30 and shaft 27 form a second variably engageable clutch 32.

The third clutch hub 30 is connected to the end of a planetary gear carrier 33. The planetary gear carrier 33 extends axially from the third clutch hub 30 toward a planetary differential gear arrangement 39 and is rotatable around the rotational axis Z.

The planetary gear carrier 33 provides support for a set of planetary gears 35, 36 and is drivingly connected to a second output shaft 34. The planetary gear carrier 33 has two parallel axial sections 33a, 33b which are connect to parallel radial sections 33c, 33d. Sections 33a, 33b support planetary gear sets 35, 36. Section 33a is radially outward from section 33b and supports a planetary gear set 35. Section 33b is radially inward from 33a and supports planetary gear set 36.

When the second variably engageable clutch 32 is engaged, torque is transferred from motor through the first ring gear 18 and planetary gear carrier 33 to output shaft 34.

The variably engageable clutches 28, 32 can be actuated by separate actuators or can be actuated by a single actuator configured to operate only one clutch at any time. The variably engageable clutches 28, 32 can be actuated by any mechanical means, i.e. motor, actuator gears, ball ramp actuator, or by hydraulic or electro-magnetic means.

The second ring gear 19 is attached via a shaft 37 to a differential caging 38. The shaft 37 extends radially inward from the second ring gear 19 and radially outward from differential caging 38. Differential caging 38 is bell-shaped and houses the planetary differential gear arrangement 39. Differential caging 38 includes an axial section 38a. Section 38a of the differential caging has a gear 40 extending radially inward thereon. Gear 40 is drivingly engaged with the first planetary gear set 35 which is drivingly engaged to the second planetary gear set 36. The first planetary gear set 35 is radially outward from the second planetary gear set 36. The second planetary gear set 36 is drivingly engaged to a sun gear 41 which is connected to output shaft 29.

A first bearing 42 is disposed between the radial shaft 21 and housing member 20 and supports gear 18. A second bearing 43 is disposed between differential caging 38 and housing member 20 and supports the planetary differential gear arrangement 39. The second bearing 43 is adjacent to the first bearing 42. Both bearings 42, 43 are supported by the housing member 20.

The output shafts 29, 34 are axle half shafts connected to right and left wheels (not shown) of a motor vehicle respectively. The drive unit can be employed as rear drive unit or a front drive unit. The output shafts 29, 34 rotate in the same direction and same speed while allowing differential action to occur if needed.

During normal operation, the speed difference that occurs across the variably engageable clutches 28, 32 is small and allows for a low clutch draft, a reduced clutch clearance, and high actuation speeds.

The first clutching device 15 when engaged couples the reducing gear set 14 to pinion gear 17. When the first clutching device 15 is disengaged, the motor 11 and the reducing gear set 14 is disconnected from output shafts 29, 34 and allows the output shafts 29, 34 to idle. When used as a secondary all-wheel driveline, output shafts 29, 34 rotate at wheel speed allowing the motor to become stationary, reducing drag and improving fuel economy. Additionally, the first clutching device 15 can be disengaged to limit the maximum motor speed under high driving speeds.

By controlling the variably engageable clutches 28, 32, the torque can forceably be transferred between output shafts 29, 34. When additional torque is needed at output shaft 29, the first variably engageable clutch 28 can be engaged allowing a second power path to form to output shaft 29 through the first ring gear 18. When additional torque is needed at output shaft 34, the second variably engageable clutch 32 can be engaged allowing a second power path to form to output shaft 34 through the first ring gear 18 and planetary carrier 33.

If the first clutching device 15 is disengaged and the motor and ring gears are disconnected, variably engageable clutches 28, 32 can still be controlled to balance torque to flow to output shafts 29, 34.

Figure 2:
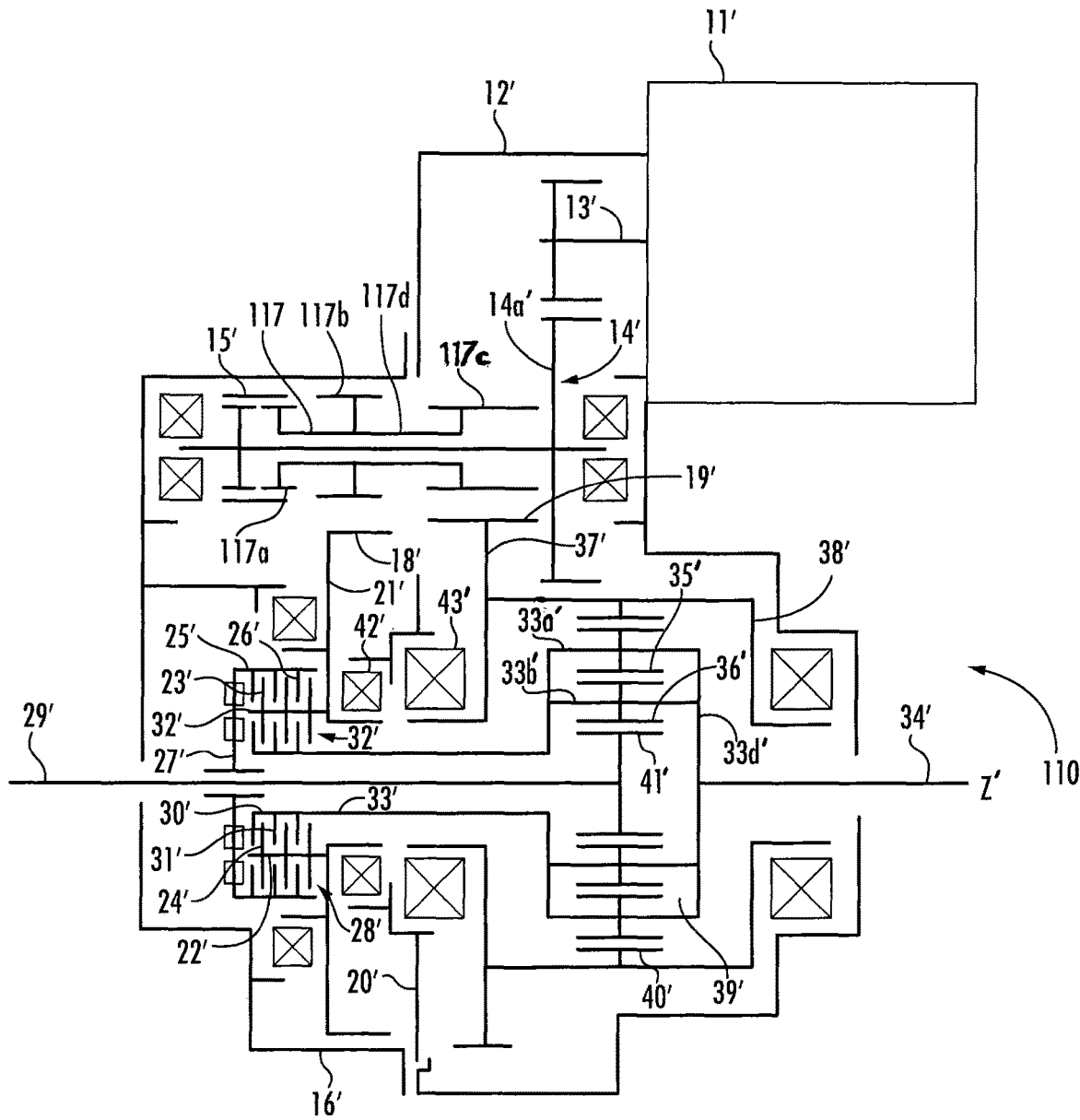
FIG. 2 is a schematic view of the drive unit assembly in accordance with another preferred embodiment of the invention.

FIG. 2 illustrates an electric drive unit according to another embodiment of the invention. The embodiment shown in FIG. 2 includes similar components to the electric drive unit illustrated in FIG. 1. Similar structural features of the electric drive unit 110 include the same reference numeral and a prime (') symbol, with the exception of the features described below.

The embodiment of the electric drive unit 110 as shown in FIG. 2 is similar to the electric drive unit 10, with the exception of the use of a pinion gear 117 having three pinion 117a, 117b, 117c, which operates similar to the pinion gear 17 illustrated in FIG. 1. The pinion gear 117 has three pinions 117a, 117b, 117c connected to an axially extending shaft 117d. Pinion 117a is capable of engaging the first clutching device 15'. Pinion 117b is drivingly engaged with ring gear 18' and pinion 117c is drivingly engaged with ring gear 19'. Pinions 117a, 117b, 117c have teeth formed thereon. The number of teeth on pinion 117b and on pinion 117c are different from one another allowing for alternative speed ratios between the first 18' and second 19' gears.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed:

1. A drive unit for a vehicle, comprising:
   a motor;
   a first gear in driving engagement with the motor;
   a second gear in driving engagement with the motor;
   a differential caging having a planetary differential gear arrangement disposed therein, wherein the planetary differential gear arrangement is in driving engagement with a first output shaft;
   at least one reducing gear positioned between the motor and the first and second gears;
   a planetary gear carrier configured to support at least a portion of the planetary differential gear arrangement, wherein the planetary gear carrier is in driving engagement with a second output shaft;
   a pinion gear disposed between the motor and at least one of the first and second gears, wherein the pinion gear includes a first pinion and a second pinion, and wherein the second pinion is in driving engagement with at least one of the first and second gears;
   a first variably engageable clutch disposed between the first gear and the first output shaft to selectively transfer torque from the first gear to the first output shaft;
   a second variably engageable clutch disposed between the first gear and the planetary gear carrier to selectively transfer torque from the first gear to the second output shaft via the planetary gear carrier; and
   a clutching device positioned between the motor and the first and second gears to selectively connect and disconnect the at least one reducing gear from the pinion gear.

2. The drive unit of claim 1, wherein the first and second gears have gear teeth disposed thereon, and wherein a number of the gear teeth on the first gear is less than a number of the gear teeth on the second gear.

3. The drive unit of claim 1, wherein the at least one reducing gear is in driving engagement with the motor.

4. The drive unit of claim 1, wherein the second gear is in driving engagement with the third gear of the differential caging.

5. The drive unit of claim 1, wherein the planetary differential gear arrangement includes a first planetary gear set and a second planetary gear set.

6. The drive unit of claim 5, wherein the third gear is in driving engagement with the first planetary gear set.

7. The drive unit of claim 1, wherein the clutching device selectively connects and disconnects the motor from the first and second gears.

8. The drive unit of claim 1, wherein the clutching device is configured to selectively engage the first pinion of the pinion gear.

9. The drive unit of claim 1, wherein the pinion gear further includes a third pinion.

10. The drive unit of claim 9, wherein the second pinion of the pinion gear is in driving engagement with the first gear and the third pinion of the pinion gear is in driving engagement with second gear.

11. A drive unit for a vehicle, comprising:
    a motor;
    a first gear in driving engagement with the motor;
    a second gear in driving engagement with the motor;
    a differential caging having a planetary differential gear arrangement disposed therein, wherein the planetary differential gear arrangement is in driving engagement with a first output shaft;
    a planetary gear carrier configured to support at least a portion of the planetary differential gear arrangement, wherein the planetary gear carrier is in driving engagement with a second output shaft;
    a pinion gear disposed between the motor and at least one of the first and second gears, the pinion gear including a first pinion, a second pinion, and a third pinion, wherein the second pinion is in driving engagement with the first gear and the third pinion is in driving engagement with the second gear;
    a first variably engageable clutch disposed between the first gear and the first output shaft to selectively transfer torque from the first gear to the first output shaft; and
    a second variably engageable clutch disposed between the first gear and the planetary gear carrier to selectively transfer torque from the first gear to the second output shaft via the planetary gear carrier.

12. The drive unit of claim 11, further comprising a reducing gear set positioned between the motor and the first and second gears, wherein the reducing gear set is in driving engagement with the motor and the first and second gears.

13. The drive unit of claim 11, wherein the differential caging further includes a third gear disposed therein.

14. The drive unit of claim 13, wherein the second gear is in driving engagement with the third gear of the differential caging.

15. The drive unit of claim 13, wherein the third gear is in driving engagement with the planetary differential gear arrangement.

16. The drive unit of claim 11, further comprising a clutching device positioned between the motor and the first and second gears to selectively connect and disconnect the motor from the first and second gears.

17. The drive unit of claim 16, wherein the clutching device is configured to selectively engage the first pinion of the pinion gear.

18. A method for selectively shifting torque between output shafts of a vehicle, comprising:
    providing a motor;
    providing a first gear in driving engagement with the motor;
    providing a second gear in driving engagement with the motor;
    providing a differential caging having a planetary differential gear arrangement disposed therein, wherein the planetary differential gear arrangement is in driving engagement with a first output shaft;

providing at least one reducing gear positioned between the motor and the first and second gears;

providing a planetary gear carrier configured to support at least a portion of the planetary differential gear arrangement, wherein the planetary gear carrier is in driving engagement with a second output shaft;

providing a pinion gear disposed between the motor and at least one of the first and second gears, wherein the pinion gear includes a first pinion and a second pinion, and wherein the second pinion is in driving engagement with at least one of the first and second gears;

providing a first variably engageable clutch disposed between the first gear and the first output shaft;

providing a second variably engageable clutch disposed between the first gear and the planetary gear carrier;

providing a clutching device positioned between the motor and the first and second gears to selectively connect and disconnect the at least one reducing gear from the pinion gear;

selectively shifting torque from the motor to the first output shaft by selectively engaging the first variably engageable clutch; and selectively shifting torque from the motor to the second output shaft via the planetary gear carrier by selectively engaging the second variably engageable clutch.

19. The method of claim 18, wherein the pinion gear further includes a third pinion.

20. The method of claim 19, wherein the second pinion of the pinion gear is in driving engagement with the first gear and the third pinion of the pinion gear is in driving engagement with second gear.

* * * * *